Aug. 14, 1945.  J. F. D. SMITH  2,382,340
VEHICLE HEATING SYSTEM
Filed Dec. 8, 1942  3 Sheets-Sheet 1

INVENTOR
John F. Downie Smith,

BY John P. Tarbox
ATTORNEY

Aug. 14, 1945.                J. F. D. SMITH                    2,382,340
                          VEHICLE HEATING SYSTEM
                         Filed Dec. 8, 1942           3 Sheets-Sheet 2
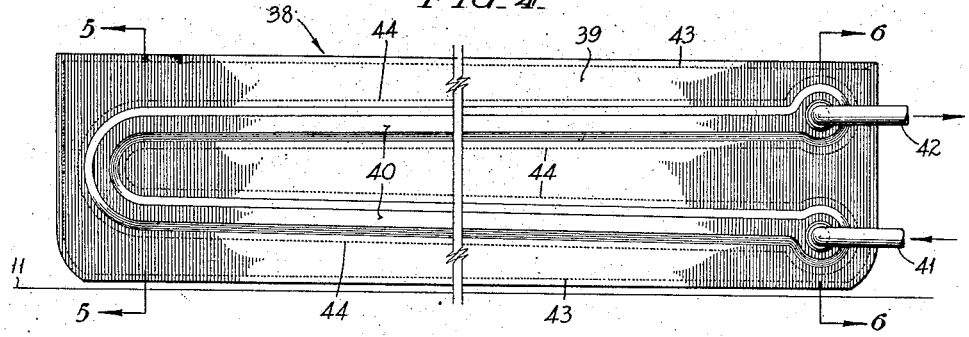
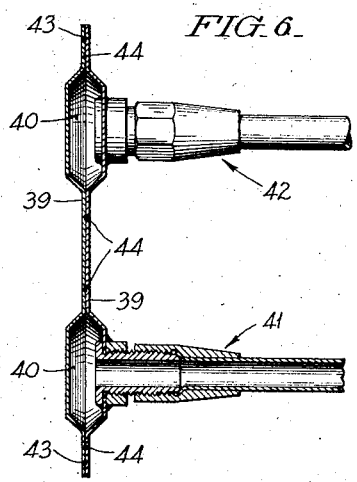
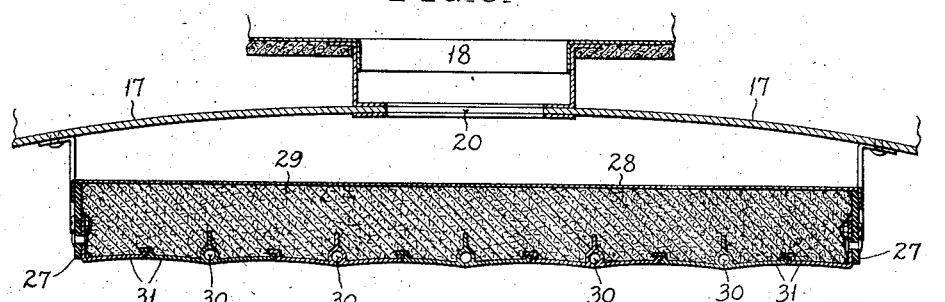
INVENTOR
John F. Downie Smith,
BY John P. Tarbox
ATTORNEY INVENTOR
John F. Downie Smith, BY John P. Tarbox
ATTORNEY Patented Aug. 14, 1945

2,382,340

UNITED STATES PATENT OFFICE 2,382,340

VEHICLE HEATING SYSTEM

John F. Downie Smith, Swampscott, Mass., assignor to Edward G. Budd Manufacturing Company, Philadelphia, Pa., a corporation of Pennsylvania Application December 8, 1942, Serial No. 468,190

2 Claims. (Cl. 237—6)

This invention relates to enclosure heating systems and more particularly to heating systems for railway passenger cars and the like.

Enclosure heating systems, in general, are for the purpose of establishing within an enclosure comfortable as well as healthful conditions for the occupants. Comfort is established as a result of a balance between enclosure air temperature, air humidity and direct radiation. In the conventional heating system, no particular attention is given or consideration made of heat exchange by direct radiation, heating being accomplished by the circulation of air through which medium heat is delivered from whatever source is present.

The present invention is directed to a heating system wherein the air temperature is maintained relatively low, for example, 60 degrees F., and in which a comfort condition is established by varying the extent of radiation.

Through such a system the circulated air requires less heat and additionally effects a reduction in heat losses in the enclosure walls. The relative humidity of the enclosure air by reason of the lower temperature will be higher, a feature which is highly desirable in cold weather heating for human comfort. In the use of such a system in the heating of railway passenger trains, as will be described hereinafter and in conjunction with which the heating system of the present invention is illustrated, the reduction in heat losses is of great importance in that it reduces the heat drain on the locomotive boiler, or such other source of heat as is utilized.

Accordingly, it is an object of the present invention to provide a system of heating in which radiant heat predominates.

Another object is to provide a system of heating wherein air temperature is maintained at a sub-normal temperature and control over human comfort conditions is had by varying the amount of radiant heat energy supplied.

Another object is to provide a railway passenger car with a heating system of the foregoing character, and in which radiation panels are located at various positions within the car and the temperature thereof regulated within safe limits.

A further object is to provide a railway passenger car with radiant heating panels of improved and most efficient operation located at predetermined positions to provide for maximum passenger comfort.

With the above and other objects in view, the present invention consists in certain features of construction and combinations of parts to be hereinafter described with reference to the accompanying drawings, and then claimed.

In the accompanying drawings which illustrate a suitable embodiment of the present invention, Figure 1 is a diagrammatic cross section through a railway car having the radiant heating system of the present invention incorporated therein;

Figure 3 is a section through a modified form of radiating panel;

Figure 4 is an enlarged side elevation of a radiant heating panel which may be placed beneath the seats.

Figure 1:
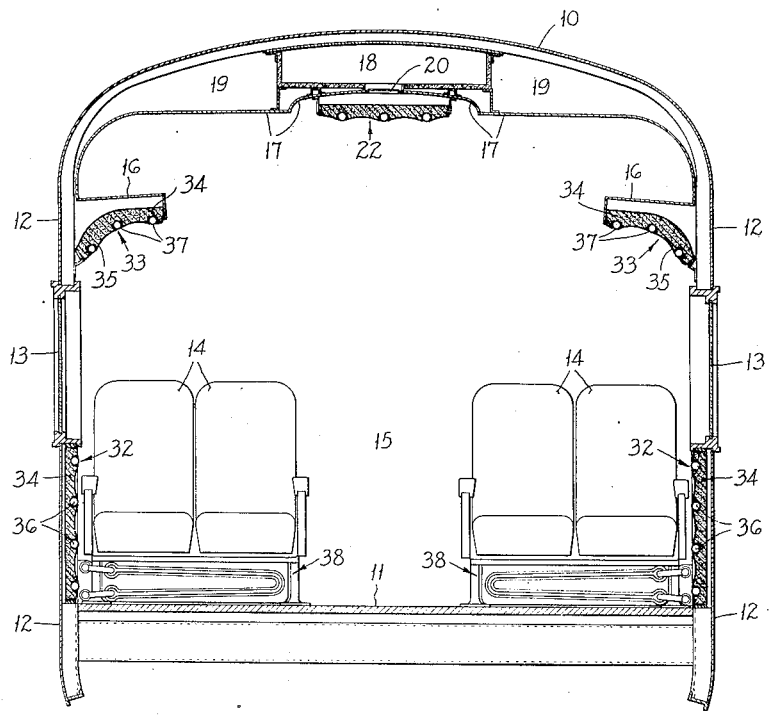
Figure 7:
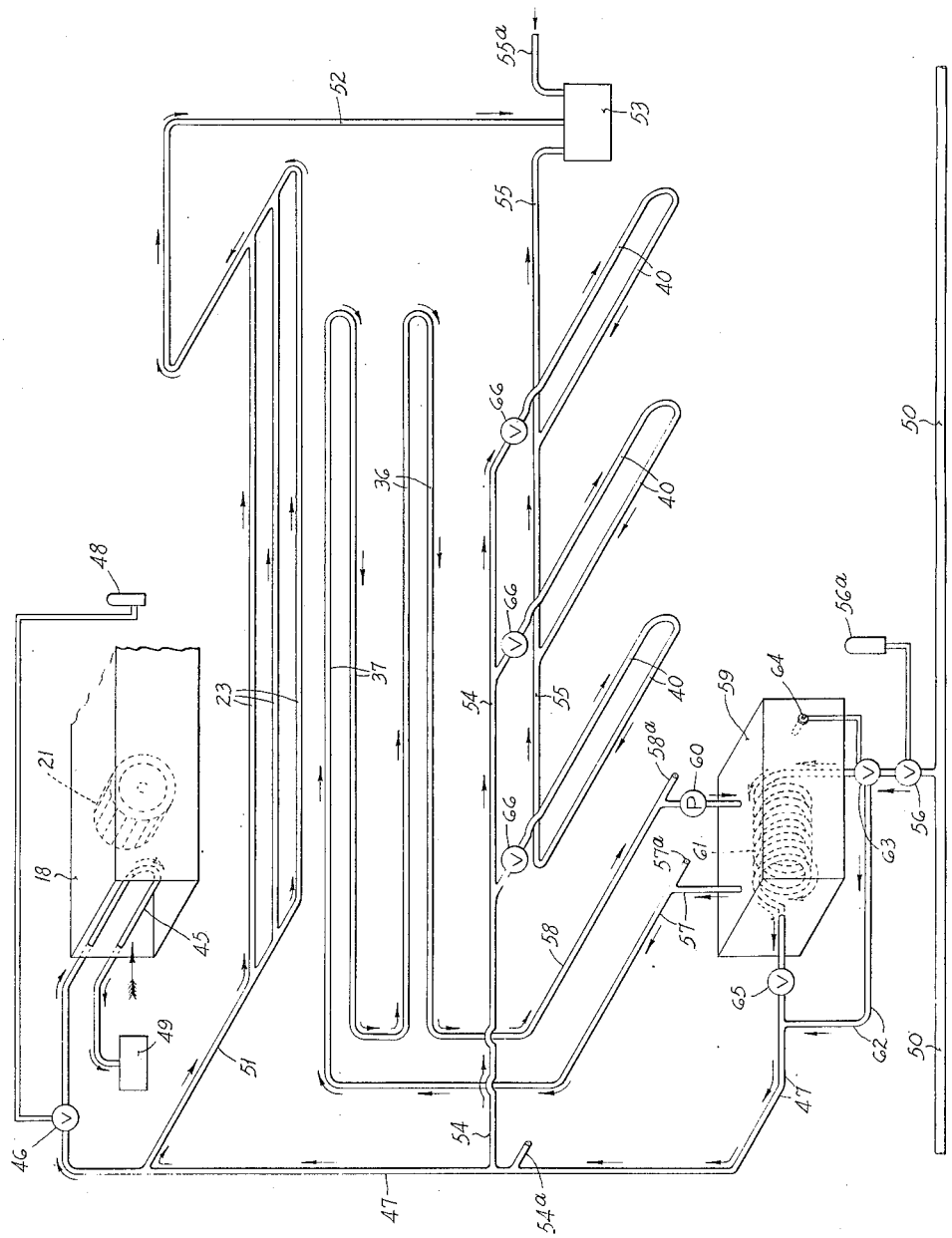

Figures 5 and 6 are transverse sections taken on the lines 5—5 and 6—6 of Figure 4, respectively, and Figure 7 is a schematic showing of the various connections for the radiant heating system utilized in Figure 1.

Referring to the accompanying drawings in which like numerals refer to like parts throughout the several views, I have shown diagrammatically, for the purpose of illustration, a railway car having a roof 10, a floor 11 and side walls 12 provided with windows 13. Transverse seats 14 are arranged in pairs at each side of the center aisle 15. As is usual practice in railway passenger cars, baggage racks 16 are extended from the side walls 12 above the windows. These baggage racks 16 preferably extend continuously from one end of the car to the other, this being the modern current practice. The enclosure to be heated is defined by the floor 11, the side walls 12 and a ceiling 17 extending between the side walls 12 but spaced from the roof 10.

In order to supply the car with sufficient quantities of fresh air, an air supply duct 18 of suitable construction is suitably arranged within the space 19 between the roof 10 and ceiling 17 to extend throughout the length of the car, the duct being provided with a desired number of discharge openings 20 at its under side which open through the ceiling 17 as illustrated in Figure 1. As illustrated diagrammatically in Figure 7, a suitable fan 21 is associated with the air supply duct 18 to cause positive circulation of the fresh air entering the duct from the outside into the interior of the car through the discharge openings 20.

To supply heat to the car in accordance with the present invention, a radiant heating panel 22 is disposed above the center aisle 15 and immediately below the fresh air duct 18 in slightly spaced relation with respect to the ceiling 17 to intercept the air flow from the discharge openings 20 and direct such fresh air outwardly in opposite directions into the interior of the car. As illustrated in Figure 1 the radiant heating panel 22 is suitably suspended from the ceiling 17.

Figure 2:
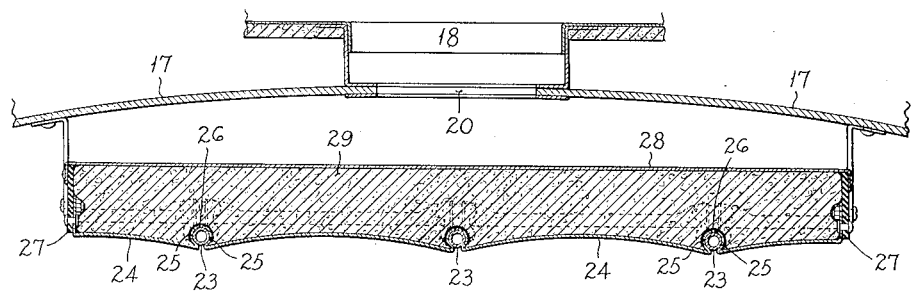
Figure 2 is a transverse section through one of the radiant heating panels, the one illustrated being the panel shown above the center aisle of the railway car of Figure 1.

The radiant heating panel 22, as more clearly shown in Figure 2, may comprise a plurality of horizontally spaced longitudinally extending conductor pipes 23 through which a heating medium is circulated, and a plurality of panels 24 of a highly efficient heat conductive material such as, for example, aluminum or aluminum alloy. The panels 24 are preferably curved as shown, each disposed between adjacent conductor pipes 23 and provided with flanges 25 in intimate heat exchange relation with the pipes 23. In order to insure efficient heat exchange relation with the pipes 23, the flanges 25 may be held in intimate contact with the pipes by locking clips 26 of spring metal or, if desired, they may be brazed, welded or otherwise suitably secured to the pipes 23. The edgemost panels 24 are secured to longitudinally extending side frames 27 of insulating board or other non-conductive material which are interconnected by a panel 28 to provide a closed space therebetween which is filled with a suitable heat insulating medium 29. It is thus seen that the adjacent longitudinally extending panels 24 provide series of concave radiation surfaces intermediate adjacent pipes 23 and disposed above the center aisle 15. The layer of heat insulation material 29 above the panels 24 eliminates heat loss through radiation in an ineffective direction. The longitudinally extending panels 24 may be cast or extruded and formed of aluminum or any desirable efficient heat conductive metal. Since aluminum is an excellent heat conductor, relatively wide spacing between the pipes 23 may be utilized without undesirable temperature differences across the radiating surfaces of the intermediate panels as the distance from the pipes increases and decreases.

In Figure 3, I have illustrated a modified form of radiating panel in which the conduits 30 are integrally cast or extruded with the radiating panels 31 to provide a highly efficient one-piece construction, it being understood that any desired number of conduits may be employed.

In addition to the center aisle radiant heating panel 22, side radiant heating panels 32 extending the full length of the car beneath the windows 13 and arcuate radiant heating panels 33 disposed at the under sides of the baggage racks 16 are preferably employed. The panels 32 and 33 are generally of the same construction as the center panel 22, each being backed by heat insulating material 34 and having arcuate radiating surfaces 35. The side panels 32 are provided with conduits 36 for the heating medium and similarly the baggage rack panels 33 are provided with conduits 37.

Additionally, vertically extending heat radiating floor panels 38 may be provided beneath each pair of seats 14 as shown in Figure 1. It is desirable that the panels 38 underneath each pair of seats 14 radiate heat forwardly and rearwardly underneath the seats. Figure 4 illustrates one form of construction suitable for these panels. As shown in Figure 4, the panel 38 comprises two sheets 39 of metal arranged in face-to-face relation each having a depression therein which when the sheets are engaged with each other cooperates with the depression in the mating sheet to provide a closed passageway 40 arranged in the form of an elongated U. At the adjacent ends of the passageway 40, one of the sheets is cut out to provide openings for the reception of inlet and outlet fittings 41 and 42, respectively. The sheets 39 are welded together around their perimeters as indicated at 43 and are continuously electrically seam welded as indicated at 44 at the sides of the passageway 40 to render the same fluidtight. The sheets 39 may be of copper, thin gauge stainless steel or any other suitable highly conductive material.

In Figure 7 there is schematically illustrated one form of connections for the various heating panels described. The fan 21 supplies the fresh air duct 18 with a predetermined amount of fresh outside air which may be heated to a predetermined temperature by a heating coil 45 located within the duct 18. Control of the supply of heating medium for the coil 45, which may be steam, may be effected through a control valve 46 arranged in the steam supply line 47. The valve 46 may be of the thermostatic type and controlled through the medium of a thermostat 48 located in the air duct 18 and set to control the valve 46 in such manner as to admit only enough heating medium to the coil 45 to heat the fresh air to a predetermined low temperature. In practice, it will be found desirable to so adjust the thermostat 48 that the air entering the interior of the car through the openings 20 will be at a temperature of approximately 60 degrees F., although such temperature may be increased or decreased to suit varying conditions. A suitable steam trap 49 is provided for the outlet of the heating coil 45.

The supply of heat to the radiation panels is such as to maintain those panels which are out of reach of the passengers at a higher temperature than those which are within reach and with which the passengers are liable to come in contact. For example, the overhead panel 22 may be heated by steam or other suitable medium and maintained at a temperature of 180 degrees F. or more, whereas the side panels 32 and the baggage rack panels 33 should be retained at a considerably lower temperature by reason of the likelihood of physical contact by the passengers. The side panels 32, for example, may be maintained at a temperature of 90 degrees F. and the baggage rack panels 33 at a temperature of 110 degrees F. However, the panels 38 located beneath the seats, since they are hidden to a considerable extent, may be heated to a temperature of 180 degrees F. and by steam, the same as the over-head panel 22.

The temperatures given here for illustration, of course, are for extreme conditions, the temperatures at which they may operate being proportionately lower in accordance with the degree of heating required.

In order to supply heating medium to the panels to different temperatures, the source of heating medium, which for example, may be steam, may be supplied directly to the over-head panel 22 and the under-seat panels 38 and that supplied to the side and baggage rack panels 32 and 33 indirectly by a secondary hot water circulating system deriving its heat in controlled manner from a heat exchange associated with the source of steam supply.

In Figure 7 there is illustrated a source 50 of steam supply extending as is usual practice the length of the car in question, the supply conduit 47 for the heating coil 45 which heats the fresh air being connected with the source 50. The pipes 23 of the over-head panel 22 are connected by supply conduit 51 to the conduit 47 aforesaid, the pipes 23 discharging through a conduit 52 into a suitable steam trap 53. Similarly, the conduits or passages 40 of the under-seat panels 38 are connected in parallel to a supply conduit 54 and a discharge conduit 55 which are connected respectively with the main conduit 47 and trap 53. The amount of steam supplied through the main supply conduit being mainly under the control of a thermostatic control valve 56 which may regulate the supply of steam in accordance with outside temperature, it being possible to establish a relationship between the amount of heat required in the radiating panels for a given outside condition. For this purpose, the valve 56 may be controlled by a device 56a responsive to the temperature of the outside air.

The pipes 36 for the side panels 32 and the pipes 37 for the baggage rack panels 33 may be arranged in series, as shown, and provided with a supply conduit 57 and a discharge conduit 58 connected with a tank or container 59, these pipes and container constituting a closed water circulating system. The pipes 36 and 37 however may be arranged in parallel and controlled for different temperatures. In order to effect circulation of water in this closed system, a pump 60 is arranged in the discharge or return conduit 58. The main supply conduit 47 passes through the container 59 as indicated at 61 in heat exchange relation with the water contained therein, the heat exchange portion 61 of the conduit 47 preferably being coiled. A by-pass 62 is arranged in the conduit 47 to by-pass steam around the heat exchange portion 61 when the water temperature in container 59 is at a desired degree, the control of which is under a thermostatic valve 63 having its temperature responsive thermostat 64 arranged within the container 59, as shown in Figure 7, and responsive to the temperature of the water of the secondary circulating system. When the water reaches a desired temperature thermostat 64 actuates valve 63 to shunt the steam through by-pass 62 to the main supply line. A suitable back pressure valve 65 may be incorporated in the system so that steam will not flow back into the heat interchange portion of supply conduit 47. In practice, by maintaining the secondary fluid at a suitable temperature, such as for example 110 degrees F. and by circulating the fluid by pump 60 at a predetermined rate, the desired temperature differential between the baggage rack radiating panels and the side radiating panels may be effected.

If desired, shut-off valve 66 may be provided for each of the under-seat radiating panel passages 40.

In Figure 7, only the supply conduits for the under-seat, the baggage rack and side panels at one side of the car are shown and it will be readily understood that the corresponding units at the other side of the car are symmetrical thereto and are connected in parallel therewith through the connections 54a, 55a, 57a and 58a.

Operation of the system as a whole should be apparent from the foregoing description, it appearing obvious that through the fan 21 air is taken in and delivered through the duct 18 after being heated by heating coil to a desired temperature, for example 60 degrees F., and then discharged into the car through the openings 20. It will appear that the discharge of heated air is directed toward the upper or back side of the center radiating panel 22 so that such heat as may find its way through the insulation 29 may be absorbed to some extent by the fresh air entering the car. Such additional heat as is required to render the passengers in the car comfortable is supplied solely by radiation from the various radiating panels described. Radiating panels 38 located beneath the passenger seats 14 are arranged to radiate heat directly to the feet of the passengers, whereas side panels 32 are arranged to radiate heat directly toward the legs of the passengers. The center panel 22 and the baggage rack radiating heat toward upper portions of the passengers' bodies. Distribution of the heat over the passengers is further enhanced by arranging the side, baggage rack and over-head panels with a plurality of arcuate surfaces as heretofore described.

It is to be noted that the windows 13, which are a considerable source of cold radiation in extreme winter weather, are to some extent sandwiched in between the side radiating panels 32 and baggage rack radiating panels 33 with the result that the chilling effect of the windows is substantially offset by the heat radiation from either side.

While the heat supplied to the system through the valve 56 has been described as dependent upon a temperature-sensitive device 56a located outside the car, it is obvious that the heat to be supplied within the car may be controlled by well-known instruments located within the car and sensitive to the factors which produce comfort, or manually if desired. Upon the admission of a determined amount of heat to the system, it will appear that the secondary heating conduits 36 and 37 forming a part of the side and baggage rack panels may take as much of the heat as is necessary to provide the temperature conditions prescribed for these panels.

There has been described a novel heating system in which reduced air temperature is employed whereby the heat expenditure is heating fresh air and the differential heat losses through the car walls and windows reduced. Additionally, the chilling effect of cold window radiation is eliminated without over-heating of the air within the car.

By arranging the radiant heat panels as shown and described, radiant heat is effective in maintaining the bodies of the passengers at a desired temperature while the air in the car itself may be materially cooler than where convection heating currents are relied upon for passenger comfort. The radiating heat rays upon impinging against a passenger will raise the passenger's body surface temperature by a greater amount than the temperature of the air through which the heat rays pass. It is obvious, therefore, that body surface may have a temperature equal to that which it would possess with the surrounding air heated to a materially higher temperature. Obviously, since in accordance with the practice described herein, the car air may be at a temperature much lower than conventional, its moisture content and relative humidity may be substantially higher, thus making the conditions existing within the car more healthful than has been possible heretofore.

It is to be understood that the invention is not to be limited to the embodiments shown and described, but may be applied in many different arrangements. As changes may be made in the construction and arrangement of the parts without departing from the spirit of the invention, as will be apparent to those skilled in the art to which the invention appertains, reference will be had to the appended claims for a definition of the limits of the invention.

What is claimed is:

1. In a heating system for a vehicle having seats, a plurality of radiant heat panels supported within the vehicle at locations so related to said seats as to direct radiant heat rays directly against different body portions of the occupants of said seats, means for heating said panels, means for maintaining said panels at temperatures such that the radiated heat rays are conducive to the body comfort of the seat occupants, means for supplying fresh outside air to the interior of the vehicle, means for heating the fresh air supplied by said last-mentioned means, and control means for said last-mentioned heating means, said control means being effective when the temperature of the outside air is below body comfort temperature to restrict heating by said last-mentioned heating means of the fresh outside air supplied by said air supplying means to a predetermined temperature less than body comfort temperature.

2. In a heating system for a vehicle having seats, a plurality of radiant heat panels supported within the vehicle at locations so related to said seats as to direct radiant heat rays directly against different body portions of the occupants of said seats, means for heating said panels, certain of said panels being susceptible of physical contact by the seat occupants, means for maintaining said panels at temperatures such that the radiated heat rays are conducive to the body comfort of the seat occupants, means for supplying fresh outside air to the interior of the vehicle, means for heating the fresh air supplied by said last-mentioned means, control means for said last-mentioned heating means, said control means being effective when the temperature of the outside air is below body comfort temperature to restrict heating by said last-mentioned heating means of the fresh outside air supplied by said air supplying means to a predetermined temperature less than body comfort temperature, and means associated with said panel heating means for maintaining said certain heating panels at temperatures lower than the remainder of said panels whereby to minimize injury to the seat occupants in the event of physical contact with said certain panels.

JOHN F. DOWNIE SMITH.